US010427189B2

(12) United States Patent
Kinsella

(10) Patent No.: US 10,427,189 B2
(45) Date of Patent: Oct. 1, 2019

(54) FLOW DIVIDER FOR SORTING APPARATUS

(75) Inventor: David Kinsella, London (GB)

(73) Assignee: Bühler UK Ltd, London (GB)

( * ) Notice: Subject to any disclaimer, the term of this patent is extended or adjusted under 35 U.S.C. 154(b) by 67 days.

(21) Appl. No.: 13/132,621

(22) PCT Filed: Dec. 3, 2009

(86) PCT No.: PCT/GB2009/002814
§ 371 (c)(1),
(2), (4) Date: Jan. 13, 2012

(87) PCT Pub. No.: WO2010/064015
PCT Pub. Date: Jun. 10, 2010

(65) Prior Publication Data
US 2012/0103875 A1 May 3, 2012

(30) Foreign Application Priority Data

Dec. 3, 2008 (GB) .................................. 0822079.0

(51) Int. Cl.
*B07B 7/04* (2006.01)
*B01D 45/08* (2006.01)
*B65G 47/76* (2006.01)

(52) U.S. Cl.
CPC ................ *B07B 7/04* (2013.01); *B01D 45/08* (2013.01); *B65G 47/766* (2013.01)

(58) Field of Classification Search
CPC ................ B65H 29/58; B65H 2404/63; B65H 2404/632; B07B 7/04
USPC ........... 209/143; 55/465; 241/79.1; 198/367, 198/442
See application file for complete search history.

(56) References Cited

U.S. PATENT DOCUMENTS

| 1,116,485 | A | * | 11/1914 | Reddy | ........................... 209/143 |
| 1,128,758 | A | * | 2/1915 | Cheesman | ....................... 19/205 |
| 2,968,400 | A | * | 1/1961 | Clute | ............................ 209/143 |
| 3,447,678 | A | | 6/1969 | Henry | |
| 3,484,801 | A | * | 12/1969 | Carlin | ..................... B62B 15/00 280/18 |
| 3,721,331 | A | * | 3/1973 | Holbrook | ................. A23N 4/18 198/367 |
| 4,120,790 | A | * | 10/1978 | Tinker et al. | ................. 210/767 |
| 4,405,451 | A | | 9/1983 | Walter | |

(Continued)

FOREIGN PATENT DOCUMENTS

| DE | 647143 | 6/1937 |
| DE | 2535881 | 2/1977 |

(Continued)

OTHER PUBLICATIONS

International Search Report for corresponding application No. PCT/GB2009/002814 dated Aug. 6, 2010.

*Primary Examiner* — Jeremy R Severson
(74) *Attorney, Agent, or Firm* — Renner, Otto, Boisselle & Sklar, LLP

(57) ABSTRACT

A flow divider assembly for a sorting apparatus, comprising a flow divider (3), which is operative to separate first and second product streams or flows (F1, F2), wherein the flow divider (3) comprises a flexible separator element (11), which has an upper edge (12) which presents a dividing edge to the product flows and the position of which is adjustable by flexing the separator element (3).

22 Claims, 2 Drawing Sheets

(56) References Cited

U.S. PATENT DOCUMENTS

| | | | |
|---|---|---|---|
| 4,765,489 A | 8/1988 | Satake | |
| 4,866,815 A * | 9/1989 | Lucassen | D01G 31/003 |
| | | | 19/200 |
| 4,889,241 A * | 12/1989 | Cogan | B07C 5/362 |
| | | | 209/552 |
| 4,909,373 A * | 3/1990 | Geerts | 198/370.05 |
| 5,129,858 A * | 7/1992 | Komori | B60H 1/3421 |
| | | | 454/155 |
| 5,607,061 A * | 3/1997 | Felden | 209/139.1 |
| 5,685,434 A | 11/1997 | Ackerman | |
| 7,422,114 B2 * | 9/2008 | Guptail | 209/44.2 |
| 8,714,366 B2 * | 5/2014 | Dirix | B65G 11/20 |
| | | | 193/2 R |
| 2002/0175113 A1 | 11/2002 | Tahkanen | |
| 2004/0217542 A1 * | 11/2004 | Aguirre Camacho | |
| | | | B65H 15/00 |
| | | | 271/186 |
| 2008/0179164 A1 * | 7/2008 | Sawall | B65G 11/103 |
| | | | 193/25 R |

FOREIGN PATENT DOCUMENTS

| | | |
|---|---|---|
| FR | 2698020 | 5/1994 |
| GB | 2250219 A | 6/1992 |

* cited by examiner

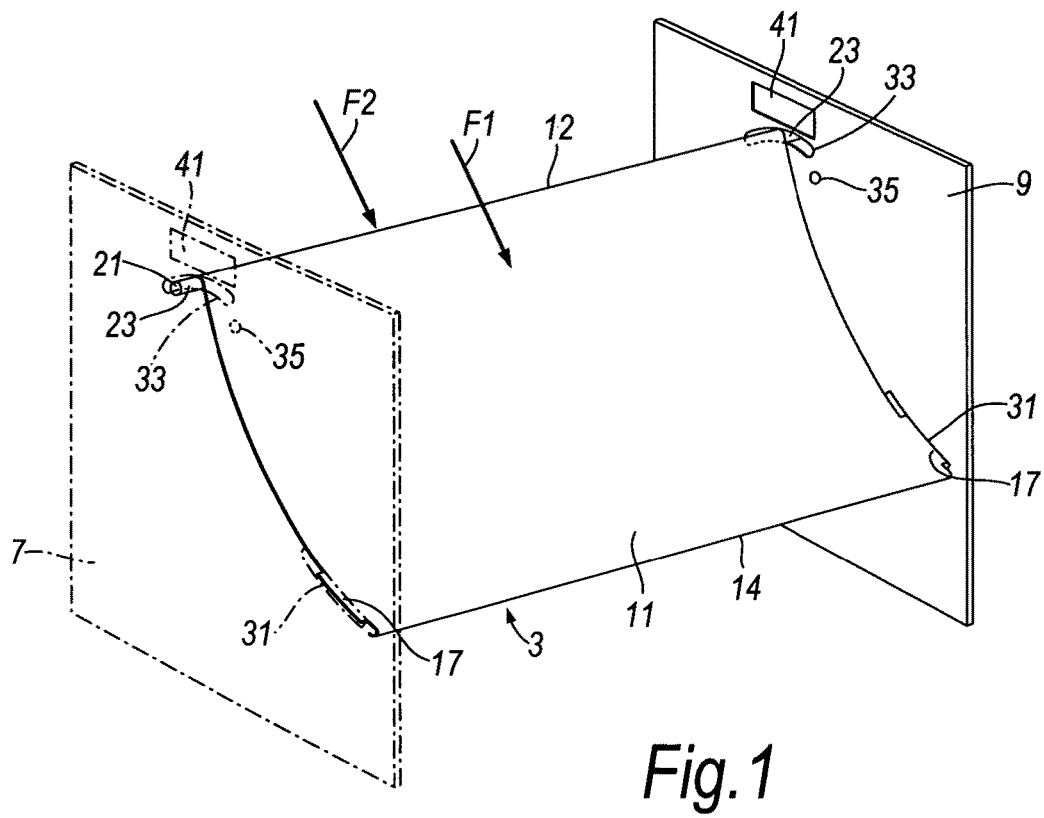
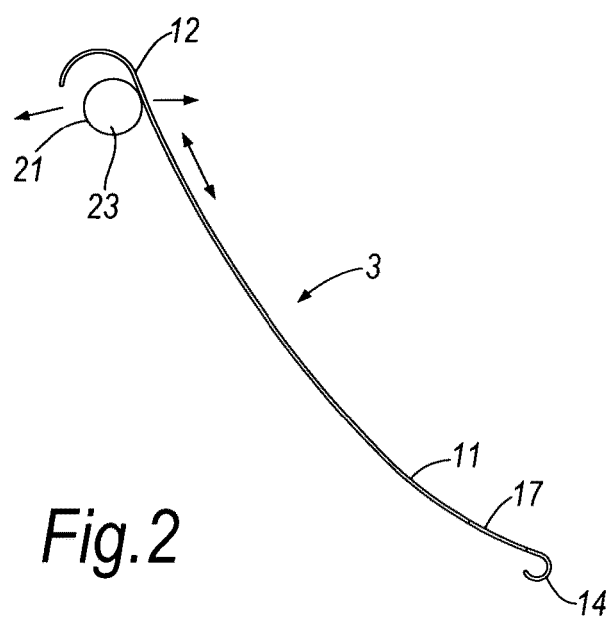

FLOW DIVIDER FOR SORTING APPARATUS

This application is a national phase of International Application No. PCT/GB2009/002814 filed Dec. 3, 2009 and published in the English language.

The present invention relates to a flow divider for use in a sorting apparatus, in particular a sorting apparatus in which product is passed through an inspection or sorting area and divided into streams or flows depending upon characterization of at least one measurable property, typically a required standard, of the material passing through the sorting area.

A typical application is in sorting foodstuffs into two streams, with the objective being to separate product into accepted and rejected product.

U.S. Pat. No. 4,765,489 discloses one existing sorting machine, in which a movable separation wall is utilized to separate mixed grains.

Other sorting machines exist which utilize a hinged separator element, in the form of a rigid plate, the upper edge of which presents a dividing edge to separate product flows, with adjustment of the position of the upper, dividing edge being achieved by hinging of the separator plate to suit the operational requirements of the machine. The adjustment is provided by means of a hinged lower edge and altering the inclination of the separator plate to set the position of the upper, dividing edge, with the position of the upper, dividing edge being fixed by means of a latching or locking mechanism.

It is an aim of the present invention to provide an, improvement in what is already known by making the separator element of simpler and cheaper construction, while retaining the ability to adjust the position of the dividing edge.

In one aspect the present invention provides a flow divider assembly for a sorting apparatus, comprising a flow divider, which is operative to separate first and second product streams or flows, wherein the flow divider comprises a flexible separator element, which has an upper edge which presents a dividing edge to the product flows and a horizontal position of which is adjusted by flexing the separator element.

In one embodiment the separator element is formed of a resilient sheet material.

In one embodiment the upper, dividing edge of the separator element is a formed edge, which confers rigidity to the upper, dividing edge of the separator element in a horizontal plane.

In one embodiment the separator element provides for adjustment of a vertical position of the upper, dividing edge thereof.

In one embodiment the separator element has a lower edge, the position of which is adjustable to allow for adjustment of the vertical position of the upper, dividing edge of the separator element.

In another embodiment the separator element has a lower edge, the position of which is fixed.

In one embodiment the lower edge of the separator element is a formed edge, which confers a rigidity to the separator element in a horizontal plane.

In one embodiment the assembly further comprises end supports to which the flow divider is supported.

In one embodiment the end supports each include an engagement recess and the separator element includes engagement features at opposite ends thereof, which are located in respective ones of the engagement recesses in the end supports.

In one embodiment the flow divider further comprises a support member which is attached to the end supports and supports an upper section of the separator element, against a bias caused by flexing of the separator element, to fix the horizontal position of the upper, dividing edge of the separator element.

In one embodiment the end supports each include a support recess, in which respective ends of the support member are located to allow for adjustment of the horizontal position of the upper, dividing edge of the separator element.

In one embodiment the support member confers rigidity to the upper, dividing edge of the separator element in a horizontal plane.

In one embodiment the support member comprises a single element which extends between the end supports along the length of the separator element.

In another embodiment the support member comprises first and second separate elements which are attached to respective ones of the end supports.

In one embodiment at least one of the end supports includes a window, which is positioned to allow an operator to view the product flows in relation to the position of the upper, dividing edge of the separator element from the respective end of the flow divider.

In one embodiment each of the end supports includes a window.

In another embodiment at least one of the end supports is formed from a transparent material through which an operator can view the product flows in relation to the position of the upper, dividing edge of the separator element from the respective end of the flow divider.

In one embodiment each of the end supports is formed from a transparent material.

In one embodiment the assembly further comprises a locking mechanism for locking the flow divider in a fixed position to the end supports.

In one embodiment the locking mechanism comprises first and second locking units, which are disposed to respective ones of the end supports.

In one embodiment the locking units each comprise a locking member, which is located on the respective end support and fixed to the respective end of the support member of the flow divider, and a locking element which is operative to lock the locking member to the respective end support, and thereby fix the position of the flow divider.

In one embodiment the locking member includes an elongate locking slot through which the locking element extends, such that the position of the flow divider can be adjusted by sliding the locking member to alter the position of the locking element in the locking slot.

In one embodiment the end supports each include a threaded locking bore and the locking element comprises a threaded locking screw which is threadedly engaged in the locking bore in the respective end support to allow for clamping and unclamping of the locking member.

In another aspect the present invention provides a flow divider assembly for a sorting apparatus, comprising a flow divider, which is operative to separate first and second product streams or flows, wherein the flow divider has an upper edge which presents a dividing edge to the product flows and a position of which is adjustable, and end supports to which the flow divider is supported, wherein at least one of the end supports includes a window or is formed of a transparent material, which allows an operator to view the product flows in relation to the position of the upper, dividing edge of the separator element from the respective end of the flow divider when adjusting the position of the upper, dividing edge.

In one embodiment at least one of the end supports includes a window.

In one embodiment each of the end supports includes a window.

In another embodiment at least one of the end supports is formed of a transparent material.

In one embodiment each of the end supports is formed of a transparent material.

The present invention also extends to a sorting apparatus incorporating the above-described flow divider assembly.

In a further aspect the present invention relates to the use of a flexible separator element as a flow divider to separate first and second product streams or flows in a sorting apparatus, wherein the separator element has an upper edge which presents a dividing edge to the product flows and a position of the upper, dividing edge is adjusted by flexing the separator element.

This arrangement offers the advantages of lower cost and improved reliability, owing to a reduction in the number of moving parts.

This arrangement also offers the advantage of not requiring the same critical alignment of the two ends of a separator plate, as would be required by a hinged arrangement.

This arrangement, in not utilizing a hinge, further offers the advantage of reducing the trapping of foodstuffs. The trapping of foodstuffs is undesirable, and thus this arrangement is more hygienic.

A preferred embodiment of the present invention will now be described hereinbelow by way of example only with reference to the accompanying drawings, in which:

FIG. 1 illustrates a flow divider assembly for a sorting apparatus in accordance with a preferred embodiment of the present invention;

FIG. 2 illustrates an end elevational view of the flow divider of the flow divider assembly of FIG. 1.

Figure 3A:
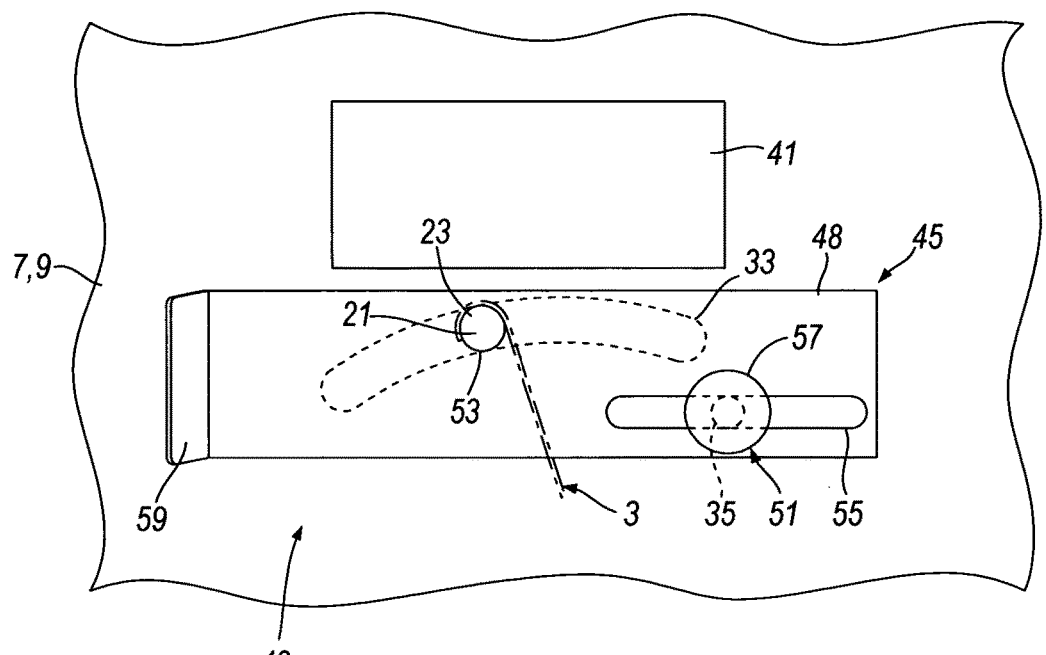
FIGS. 3(a) and (b) illustrate in enlarged scale side and end elevational views of a locking mechanism and a viewing window of the flow divider assembly of FIG. 1.
Figure 3B:
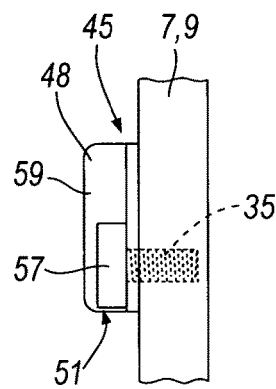

The flow divider assembly comprises a flow divider 3, which is operative to separate first and second product streams or flows F1, F2, and end supports 7, 9 to which the flow divider 3 is supported.

In a preferred embodiment the product flows F1, F2 represent a normal product flow F1 of desired product and a separated product flow F2 of separated product, separated, from the normal product flow F1, such as of product which does not comply with one or more predetermined product criteria.

Typically, product passes through a machine under the influence of gravity, and, within certain limits, product which has similar physical properties and is not acted upon in any other way, will assume a similar (normal) trajectory, providing the normal product flow F1, and product which does not satisfy one or more predetermined product criteria is separated as the separated product flow F2.

In one embodiment video recognition techniques are employed to determine the quality of product by analysis of various visual properties, and, by means of control circuitry having inputs from video analysis circuits, jets of air, which are directed at a product stream, are activated such that selected product is deflected away from, and at a tangent to, the normal trajectory, to provide the separated product flow F2, with the undeflected product providing the normal product flow F1.

A dividing edge is positioned such that product deflected as described, as the separated product flow F2, passes to one side of the dividing edge, while product which continues on an unaltered trajectory, as the first, normal product flow F1, passes on the other side of the dividing edge.

The extent of the deflection of product by the air jets may be varied by the amount of energy imparted by the air jets, and the position of the dividing edge, either in the direction of deflection or away from the direction of deflection, will have an effect on the separation characteristics of the apparatus. Adjustment of the position of the dividing edge is thus required.

There are other characteristics which influence deflection, which include the speed of operation of the valves which control the air jets, which may vary due, for example, to fluctuation in the operating voltage, the pressure of the air jets, and the mass of the product particles, with the amount of deflection being a function of the mass.

The flow divider 3 comprises a flexible separator element 11, which has upper and lower edges 12, 14, the upper edge 12 of which presents a dividing edge to the product flows F1, F2, in this embodiment a linear edge.

In this embodiment the upper, dividing edge 12 of the separator element 11 is movable by flexing of the separator element 11, such as to allow for movement of the division between the product flows F1, F2.

In this embodiment the lower edge 14 of the separator element 11 is a formed edge, which confers a rigidity to the lower edge 14 of the separator element 11 in a horizontal plane.

In this embodiment the separator element 11 includes engagement features 17, 17 at opposite lower ends thereof, which are located in counterpart engagement recesses 31, 31 in the end supports 7, 9, as will be described in more detail hereinbelow.

In this embodiment the separator element 11 is formed of a thin, resilient sheet material, such as stainless steel or other suitable material.

The flow divider 3 further comprises a support member 21 which is attached to the end supports 7, 9 and supports an upper section of the separator element 11, here against the bias caused by flexing of the separator element 11, such as to fix the horizontal position of the upper, dividing edge 12 of the separator element 11.

In this embodiment the support member 21 comprises an elongate bar which extends between the end supports 7, 9.

In this embodiment opposite ends 23, 23 of the support member 21 are located in counterpart supporting recesses 33, 33 in the end supports 7, 9 to allow for adjustment of the horizontal position of the upper, dividing edge 12 of the separator element 11, as will be described in more detail hereinbelow.

In this embodiment the support member 21 confers rigidity to the upper, dividing edge 12 of the separator element 11 in a horizontal plane.

In one embodiment the upper, dividing edge 12 of the separator element 11 could be a formed edge, which confers rigidity to the upper, dividing edge 12 of the separator element 11 in a horizontal plane.

In an alternative embodiment the support member 21 could be formed as two separate elements, such as stub bars, which are located in the counterpart supporting recesses 33, 33 in respective ones of the end supports 7, 9.

In this embodiment the end supports 7, 9 each include an engagement recess 31, which receives the engagement feature 17 at the respective end of the separator element 11, a supporting recess 33, here an arcuate, elongate through slot, which receives the supporting member 21, and a locking bore 35, here a threaded bore, which provides for locking of a locking member 45 to the respective end support 7, 9, as will be described in more detail hereinbelow.

In this embodiment the engagement recesses 31, 31 in the end supports 7, 9 are elongate recesses which allow for adjustment of the position of the engagement features 17, 17 of the separator element 11 therein, thereby providing for adjustment of the vertical position of the upper, dividing edge 12 of the separator element 11.

In an alternative embodiment the lower edge 14 of the separator element 11 could be fixed, and the separator element 11 configured, such as being formed of two slideable parts, to allow for adjustment of the vertical position of the upper, dividing edge 12 of the separator element 11.

In this embodiment the end supports 7, 9 each further include a window 41, which is positioned to allow an operator to view the product flows F1, F2 in relation to the position of the upper, dividing edge 12 of the separator element 11 from the respective ends of the flow divider 3. The provision of the windows 41 facilitates adjustment of the position of the upper, dividing edge 12 of the separator element 11, allowing this adjustment to be performed with reference to the position of the separator element 11 in relation to the visible product flows F1, F2. By enabling adjustment of the position of the upper, dividing edge 12 of the separator element 11 with visibility of the product flows F1, F2, the present invention advantageously enables improved adjustment of the position of the separator element 11, resulting in an improvement in machine performance in relation to separation of rejected product.

In this embodiment the windows 41 are made from a transparent insert, preferably a clear plastic material.

In an alternative embodiment the end supports 7, 9, instead of including windows 41, could be formed from a transparent material. In one embodiment the end supports 7, 9 could be formed from clear panels.

The flow divider assembly further comprises a locking mechanism 43 for locking the flow divider 3 in a fixed position to the end supports 7, 9.

In this embodiment the locking mechanism 43 comprises first and second locking units 45, 45, which are disposed to respective ones of the end supports 7, 9. For ease of understanding, the locking units 45, 45 are not illustrated in FIG. 1, and one of the locking units 45, 45, the other being identical, is shown in FIGS. 3(a) and (b).

In this embodiment the locking units 45, 45 each comprise a locking member 48, here a plate, which is located to the outer side of the respective end support 7, 9 and fixed to the respective end 23 of the support member 21 of the flow divider 3, and a locking element 51 which is operative to lock the locking member 48 to the respective end support 7, 9, and thereby fix the position of the flow divider 3.

In this embodiment the locking member 48 includes a fixing hole 53, counterpart to the end 23 of the support member 21 of the flow divider 3, in which the end 23 of the support member 21 is fixed.

In this embodiment the locking member 48 includes an elongate locking slot 55 through which the locking element 51 extends, such that the position of the flow divider 3 can be adjusted by sliding the locking member 48 to alter the position of the locking element 51 in the locking slot 55.

In this embodiment the locking element 51 comprises a threaded locking screw 57 which is threadedly engaged in the locking bore 35 in the respective end support 7, 9 to allow for clamping and unclamping of the locking member 48.

In this embodiment the locking member 48 includes a folded end extension 59, which acts as a hand hold when moving the locking member 48.

Finally, it will be understood that the present invention has been described in its preferred embodiment and can be modified in many different ways without departing from the scope of the invention as defined by the appended claims.

In one modification, other arrangements for holding the support member 21 in position in the supporting recesses 33, 33 are possible. For example, the supporting recesses 33, 33 could each include a plurality of indents which are located at predetermined positions to locate the ends 23, 23 of the support member 21 in discrete positions in the supporting recesses 33, 33.

In another modification, the separator element 11 could be alternatively fixed to the end supports 7, 9, for example, by way of welding, such as spot welding, screws or rivets.

The invention claimed is:

1. A sorting apparatus including a flow divider assembly comprising:
   a flow divider, which is configured to separate first and second product streams or flows, wherein the flow divider comprises a flexible separator element formed of a resilient sheet, wherein the separator element has a downstream lower edge and an upstream upper edge which presents a dividing edge to the first and second product streams or flows so that the first and second product streams or flows pass respectively to opposite sides of the upper, dividing edge; and
   end supports to which the flow divider is supported;
   wherein a horizontal position of the upper, dividing edge of the separator element is adjusted by flexing the resilient sheet between the lower and upper edges of the separator element; and
   wherein the separator element provides for adjustment of a vertical position of the upper, dividing edge of the separator element independently of the horizontal position of the upper, dividing edge of the separator element.

2. The sorting apparatus of claim 1, wherein the upper, dividing edge of the separator element is a formed edge, which confers rigidity to the upper, dividing edge of the separator element in a horizontal plane.

3. The sorting apparatus of claim 1, a position of the lower edge of the separator element is adjustable to allow for adjustment of the vertical position of the upper, dividing edge of the separator element.

4. The sorting apparatus of claim 1, wherein a position of the lower edge of the separator element is fixed.

5. The sorting apparatus of claim 1, wherein the lower edge of the separator element is a formed edge and confers a rigidity to the separator element in a horizontal plane.

6. The sorting apparatus of claim 1, wherein the end supports each include an engagement recess and the separator element includes engagement features at opposite ends thereof, which are located in respective ones of the engagement recesses in the end supports.

7. The sorting apparatus of claim 1, wherein the flow divider further comprises a support member which is attached to the end supports and supports an upper section of the separator element, against a bias caused by flexing of the separator element, to fix the horizontal position of the upper, dividing edge of the separator element.

8. The sorting apparatus of claim 7, wherein the end supports each include a support recess, in which respective ends of the support member are located to allow for adjustment of the horizontal position of the upper, dividing edge of the separator element.

9. The sorting apparatus of claim 7, wherein the support member confers rigidity to the upper, dividing edge of the separator element in a horizontal plane.

10. The sorting apparatus of claim 7, wherein the support member comprises a single element which extends between the end supports along the length of the separator element.

11. The sorting apparatus of claim 7, wherein the support member comprises first and second separate elements which are attached to respective ones of the end supports.

12. The sorting apparatus of claim 1, further comprising:
a locking mechanism for locking the flow divider in a fixed position to the end supports.

13. The sorting apparatus of claim 1, wherein the position of the upper, dividing edge is adjustable in a direction perpendicular to the upper, dividing edge while the resilient sheet flexes to accommodate such adjustment of the position of the upper, dividing edge.

14. A flow divider assembly for a sorting apparatus, comprising:
a flow divider, which is operative to separate first and second product streams or flows, wherein the flow divider comprises a flexible separator element, which has an upper edge which presents a dividing edge to the first and second product streams or flows so that the first and second product streams or flows pass respectively to opposite sides of the upper, dividing edge, and a horizontal position of the upper, dividing edge is adjusted by flexing the separator element; and
end supports to which the flow divider is supported, wherein at least one of the end supports includes a window, which is positioned to allow an operator to view the first and second product streams or flows in relation to the position of the upper, dividing edge of the separator element from the respective end of the flow divider.

15. The assembly of claim 14, wherein each of the end supports includes a window.

16. A flow divider assembly for a sorting apparatus, comprising:
a flow divider, which is operative to separate first and second product streams or flows, wherein the flow divider comprises a flexible separator element, which has an upper edge which presents a dividing edge to the first and second product streams or flows so that the first and second product streams or flows pass respectively to opposite sides of the upper, dividing edge, and a horizontal position of the upper, dividing edge is adjusted by flexing the separator element; and
end supports to which the flow divider is supported, wherein at least one of the end supports is formed from a transparent material through which an operator can view the first and second product streams or flows in relation to the position of the upper, dividing edge of the separator element from the respective end of the flow divider.

17. The assembly of claim 16, wherein each of the end supports is formed from a transparent material.

18. A sorting method for separating first and second product streams or flows, the method comprising the steps of:
providing a flexible separator element which is formed of a resilient sheet and has lower and upper edges;
positioning the separator element to present the upper edge thereof as a dividing edge to the first and second product streams or flows so that the first and second product streams or flows pass respectively to opposite sides of the upper, dividing edge; and
adjusting a position of the upper, dividing edge by flexing the resilient sheet between the lower and upper edges.

19. A flow divider assembly for a sorting apparatus, comprising:
a flow divider, which is operative to separate first and second product streams or flows, wherein the flow divider comprises a flexible separator element, which has an upper edge which presents a dividing edge to the first and second product streams or flows so that the first and second product streams or flows pass respectively to opposite sides of the upper, dividing edge, and a horizontal position of the upper, dividing edge is adjusted by flexing the separator element;
end supports to which the flow divider is supported; and
a locking mechanism for locking the flow divider in a fixed position to the end supports, wherein the locking mechanism comprises first and second locking units, which are disposed to respective ones of the end supports.

20. The assembly of claim 19, wherein the locking units each comprise a locking member, which is located on the respective end support and fixed to the respective end of the support member of the flow divider, and a locking element which is operative to lock the locking member to the respective end support, and thereby fix the position of the flow divider.

21. The assembly of claim 20, wherein the locking member includes an elongate locking slot through which the locking element extends, such that the position of the flow divider can be adjusted by sliding the locking member to alter the position of the locking element in the locking slot.

22. The assembly of claim 21, wherein the end supports each include a threaded locking bore and the locking element comprises a threaded locking screw which is threadedly engaged in the locking bore in the respective end support to allow for clamping and unclamping of the locking member.

* * * * *